March 6, 1951 W. M. MORAGNE 2,544,275
MACHINE FOR PREPARING SEED CANE
Original Filed March 23, 1946 4 Sheets-Sheet 1
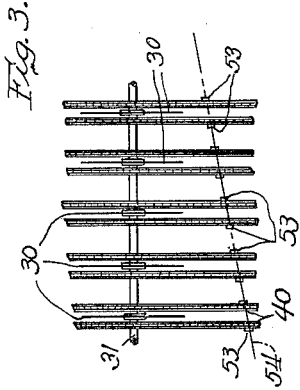
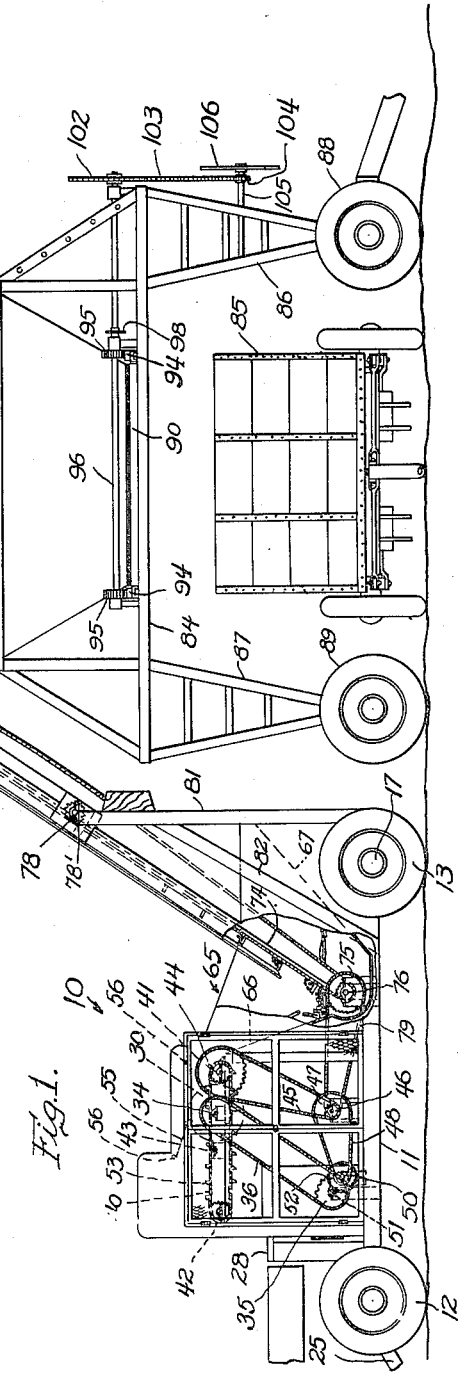
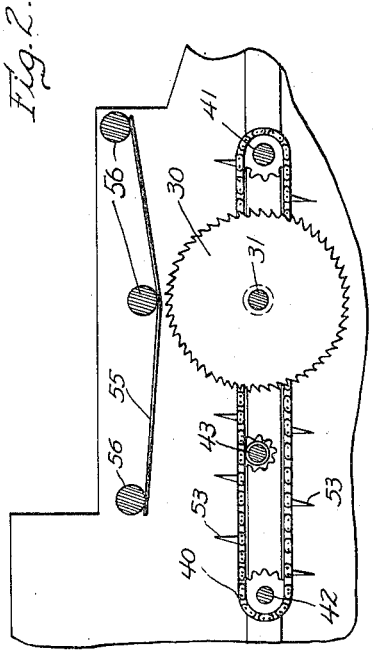
Inventor:
William M. Moragne.
By Brown, Jackson, Boettcher & Dienner
Attys.

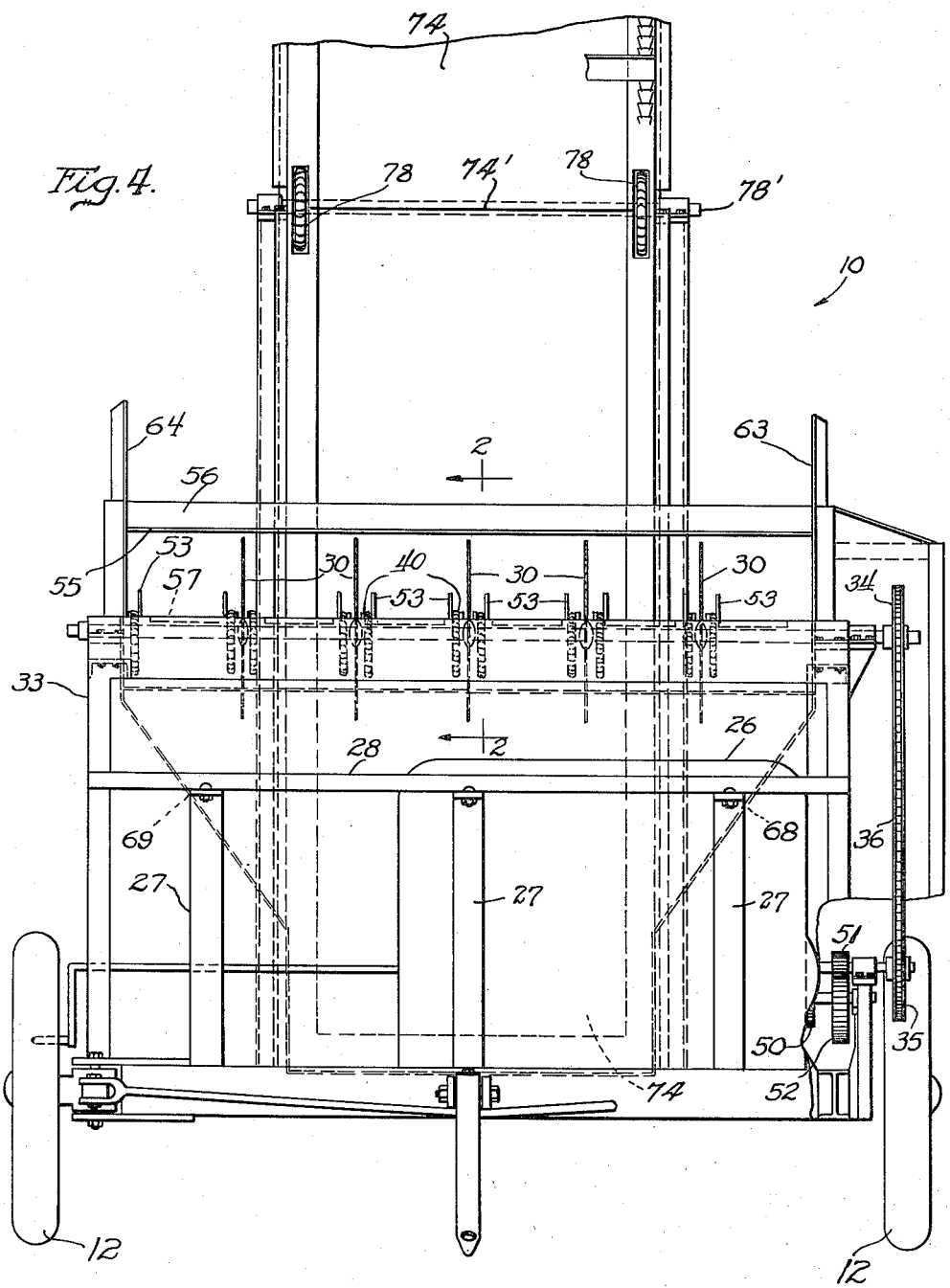

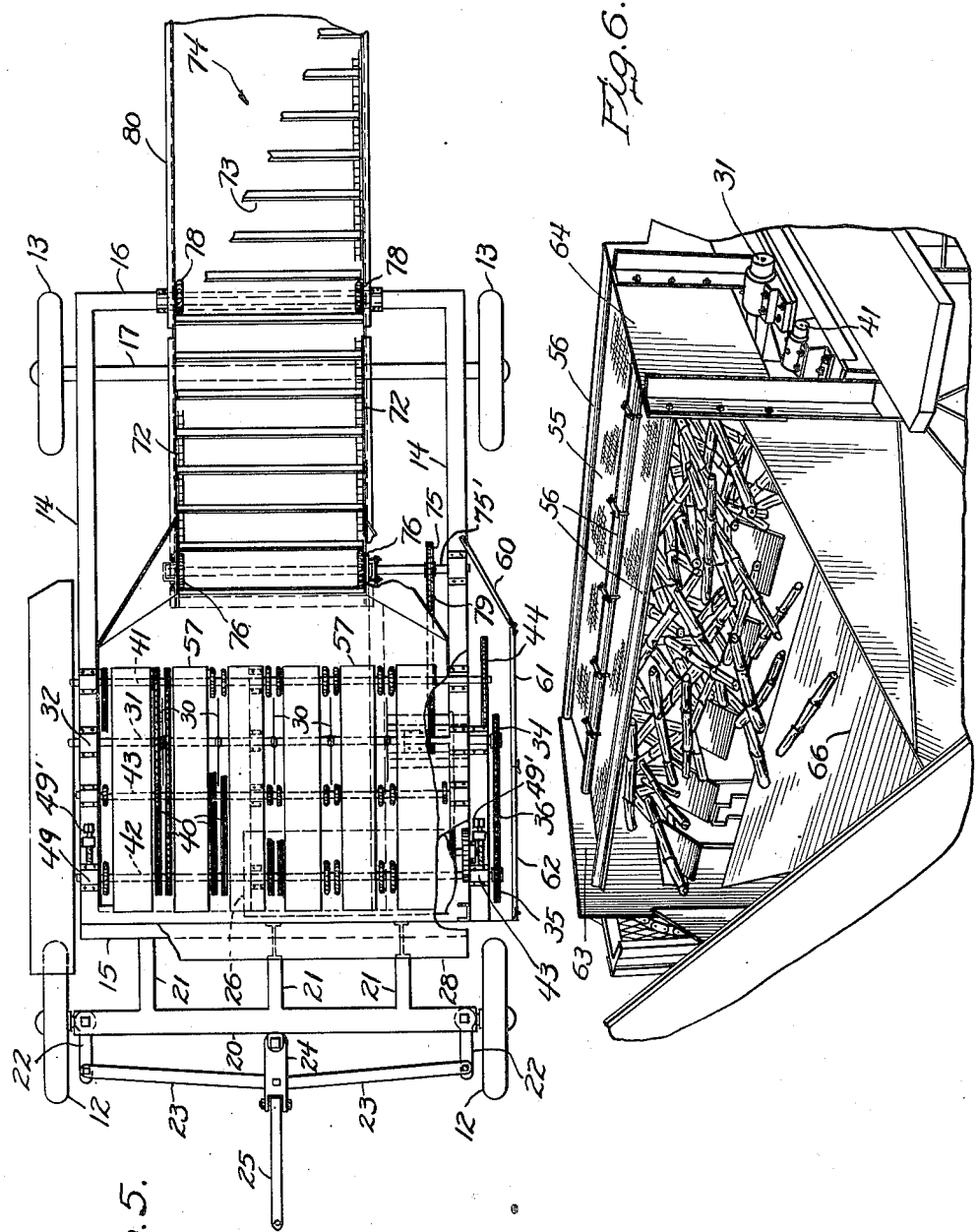

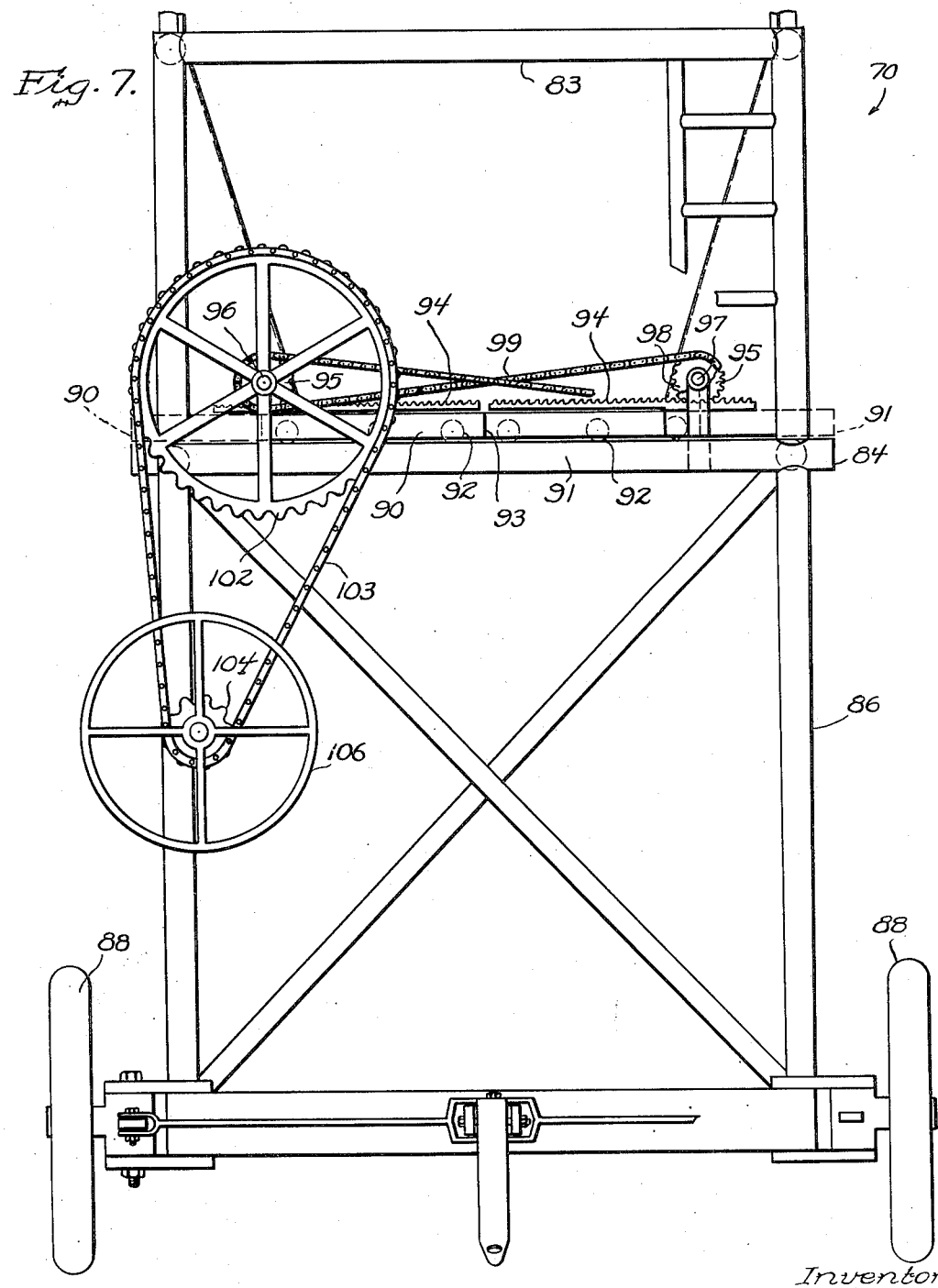

Patented Mar. 6, 1951

2,544,275

UNITED STATES PATENT OFFICE 2,544,275

MACHINE FOR PREPARING SEED CANE

William M. Moragne, Lihue, Territory of Hawaii, assignor to Grove Farm Company, Limited, Puhi, Kauai, Territory of Hawaii, a corporation of Hawaii Original application March 23, 1946, Serial No. 656,654. Divided and this application September 7, 1948, Serial No. 48,118

8 Claims. (Cl. 47—1)

This invention relates to a new and useful machine, whereby sugar cane stalks may be converted into relatively short seed cane segments in an efficient, large scale operation.

The present application is divisional of Serial No. 656,654, filed March 23, 1946, which has been abandoned.

Briefly, the present conventional method of preparation of seed cane consists of first cutting the sugar cane stalks by hand, after which the stalks are cut into sections or segments of the desired length and thrown into piles on the ground. The sections are later picked up from the piles by hand, dipped into a fungicide solution and again thrown into piles on the ground. Next, the treated seeds are bagged by hand into burlap sacks. These filled bags weigh from 40 to 70 pounds. The bags of seeds are then loaded on a truck and hauled to the field which is to be planted. The bags of seeds are then unloaded onto the ground in close proximity to the planting machine. The next step is to load the seed on the planter in lots of 20 to 100 bags depending upon the size and design of the planter. The final step is to empty the bags into loose seed hoppers from which the seed cane is fed by hand to various mechanical means for placing it in the ground. It will be seen that the conventional method above outlined involves some eight separate handling steps.

The general object of the present invention is the provision of a machine by the use of which sugar cane stalks may, on a large scale, be cut into seed length segments, immediately treated with fungicide solution, and elevated to a large capacity hopper from which planting machines may be loaded.

A specific object of the invention is the provision of a machine and a method whereby, in the matter of a very few seconds (usually two) after cutting, the seed cane segments are treated with fungicide.

Still another object of the invention is the providsion of a seed cane storage hopper having a bottom construction particularly adapted for discharging seed cane and like material therefrom.

Certain further objects of the invention will, in part, be obvious and will in part appear hereinafter.

Briefly stated, the seed cutting machine provided by this invention comprises, an efficient conveyor mechanism for delivering in quantity sugar cane stalks to a saw unit having a row of circular saws spaced apart upon a single drive shaft. The conveyor also delivers the cut seed cane into a hopper containing a suitable fungicide solution, from which the treated cane is elevated to a seed storage hopper having the particular form of discharging bottom mentioned above. For a more complete understanding of the nature and scope of this invention, reference may be had to the following detailed description thereof taken in connection with the accompanying drawings, wherein:

Figure 1 is a side elevational view, partly broken away, of a seed cutter machine forming one embodiment of this invention, shown in assembly with a storage hopper for the seed cane, and under which a planting machine is disposed for loading;

Figure 2 is a fragmentary view taken on line 2—2 of Figure 4;

Figure 3 is a fragmentary top plan view illustrating the manner in which the conveyor mechanism brings a sugar cane stalk against the saw unit at an angle for cutting;

Figure 4 is a fragmentary front elevational view, partly broken away to show the chain drive connection for the saw unit, of the seed cutter machine of Figure 1;

Figure 5 is a top plan view of the seed cutter as shown in Figure 4, being similarly broken away in part;

Figure 6 is a perspective view taken from the rear side of the saw unit of the seed cutter machine, and illustrating the manner in which the seed cane fragments leave the saws and are delivered into the fungicide containing hopper; and Figure 7 is a fragmentary right and elevational view of the seed cane storage hopper shown in Figure 1, and showing the mechanism for opening and closing the bottom of the hopper.

Referring now to Figures 1, 4 and 5 of the drawings, the seed cutter is designated in its entirety by the reference character 10. The various components of the seed cutter 10 are supported upon a chassis 11 the frame of which is largely constructed from steel beams and cross members. The chassis 11 carries a pair of front wheels 12, mounted for turning, and a pair of rear wheels 13, so that it may be conveniently transported over ground. The exact details of construction of the chassis 11 are not particularly critical. It consists essentially of side members 14 (Figure 5), a front cross beam 15 and a rear cross beam 16. The rear wheels 13 are carried on opposite projecting ends of an axle 17, while the front wheels 12 are each turnably mounted on the ends of a cross support 20, as shown in Figure 5. The member 20 is connected with the main rectangular frame of the chassis 11 by means of three short sections 21 extending from member 20 to the front cross member 15. The front wheels 12 are turned by means of a linkage system consisting of a pair of short links 22, a pair of long links 23 connecting the projecting ends of the links 22 to a center link 24, and a tongue 25 attached to the free end of the center link 24.

The power unit for the seed cutter 10 is mounted on the front right hand corner, as indicated at 26. A 40 horse-power Diesel engine has served satisfactorily for this purpose. The engine 26 and other parts of the seed cutter 10 are protected from the back ends of platform trucks backing up to the seed cutter 10, by means of three heavy bumper posts 27 (Figure 4) supporting a heavy cross beam 28 on the top ends thereof.

Sugar cane stalks fed to the seed cutter 10 are cut into relatively short pieces or segments by means of a saw unit consisting of five circular saws 30 mounted upon a single drive shaft 31 suitably journaled in bearings 32, as best shown in Figure 5. The bearings 32 are supported upon opposite sides of a saw table 33 (Figure 4) of rigid construction built upon the front part of the chassis 11. The circular saws 30 may be 24" in diameter and are uniformly spaced apart on the shaft 31 a distance corresponding to the length into which it is desired to cut the stalks. This length is optional, being usually from 12" to 18" and in the preferred construction about 15". A satisfactory speed for the saws 30 is approximately 1500 R. P. M. As viewed from the front, the right hand end of the saw drive shaft 31 carries a sprocket 34 which is driven from a sprocket 35 by means of a chain 36, the sprocket 35 being mounted directly upon the drive shaft of the power unit 26.

The conveyor mechanism for delivering sugar cane stalks to the row of saws 30 comprises five sets or pairs of chains 40 (one set for each saw) as shown in Figures 2, 3 and 5. The chains 40 are carried upon three sets of sprockets which are respectively, mounted upon a conveyor drive shaft 41 (Figure 5), a front idle shaft 42, and a center idle shaft 43. The bearings 49 which support the front idle shaft 42 upon the saw table frame 33, are longitudinally adjustable in a front-to-rear direction, as by jack screws 49' (see Figure 5) so that the tautness of the chains 40 may be adjusted as required. It will be noted that each chain 40 extends adjacent to each saw on one side thereof in a front-to-rear direction substantially at right angles to the saw unit drive shaft 31. It will be further noted that the top half of each of the chains 40 lies just above the saw drive shaft 31, while the lower half of the chains 40 lie underneath the drive shaft 31. This arrangement is best shown in Figure 2. The chains 40 are driven in a clockwise direction to carry stalks onto the saws 30 by means of the conveyor drive shaft 41. This drive shaft is connected in driving relationship with the power unit 26 through the following power transmitting arrangement: A sprocket 44 (Figures 1 and 5) is mounted on the right hand end of the shaft 41 and is connected by a chain 45 to a small sprocket 46, as best shown in Figure 1. The sprocket 46 is mounted on a stub shaft carrying a larger sprocket 47, which in turn, by means of a chain 48, which is driven by a sprocket 50 mounted upon a second stub shaft which is connected in driving relationship with the power unit 26 by means of a pair of meshing gears 51 and 52, as shown in Figure 4.

It will be understood that the details of the driving arrangement of the conveyor drive shaft 41, as well as the saw unit drive shaft 31, are not particularly important so long as sound mechanical principles are observed.

The chains 40 serve to carry stalks to the saws 30 by means of a plurality of outwardly projecting, forwardly inclined (when on top) fingers 53, as best shown in Figures 2 and 3. The chains 40 and the projecting fingers 53 are arranged in a predetermined alignment which is important in the operation of the machine. This arrangement is best shown in Figure 3 wherein the broken line 54 shows that as the fingers 53 approach the row of saws 30, they align themselves at an acute angle with the front edges of the saws 30. This angle may be quite small, but is highly important, as it prevents binding on the saws and consequent strain upon the saw and conveyor units, which may result in damage to these parts and their driving arrangements. Furthermore, by not having the stalks bind on the saws 30, the latter do not tend to slow down, and thereby splitting of the seed cane rind is reduced to a minimum. Once the alignment of the teeth or fingers 53 is made, it is preserved since the chains 40 retain their respective positions on their drive and idle sprockets.

In order to prevent high riding stalks from passing over the saws 30, a shield 55 (Figure 2) in the form of a thin metal sheet, is supported over the saws 30 from three transverse rods 56. The center portion of the shield 55 is lowermost and is spaced away from the top of the saws 30 to the extent of from one-quarter to a half inch. The front and back portions of the shield 55 are tilted or inclined upwardly at a small angle. This shield 55 is an important feature of the seed cutter machine 10, since it allows cutting of many stalks in bundles or a solid blanket, without misses. In addition, the shield 55 serves a dual purpose in acting as a safety cover for the saws 30.

In between the sets of chains 40 and between the outside sets of chains and the sides of the saw table 33, there are positioned six platform sections 57, which in cooperation with the sets of chains 40 serve to provide a substantially continuous table surface for the conveyor. The driving sprockets and chains on the right hand side of the seed cutter machine 10 are enclosed in a housing shown in Figure 5 which comprises three sections 60, 61 and 62 in the form of heavy metal screens in suitable frames so as to permit ready access to the driving mechanism for the saw unit and the conveyor. Bundles of stalks are retained on the saw table by the upstanding sides 63 and 64, as shown in Figure 4.

The shield 55 and the platform sections 57 define a substantially horizontally extending throat. The saws 30 have cutting edges extending substantially the full height of the throat. The throat is long enough to take full length stalks sidewise and the conveyor belts or chains 40 carry each stalk of a bundle successively into the cutting edges of the saws and then transport the cutting segments to the rear of the saw to discharge the same into the fungicide in the hopper 83.

Seed segments cut by the saws 30 are dumped by the conveyor mechanism into a hopper indicated generally at 65 in Figure 1, which is positioned immediately to the rear of and beneath the rear end of the conveying mechanism and the saws 30. The manner in which the seed segments are transferred to the hopper 65 is best shown in Figure 6. The hopper 65 is fluid-tight since it normally holds a fungicide solution for treating the seed sections. The hopper 65 is of sheet metal construction having an upwardly inclined front wall or apron 66 extending from the bottom of the hopper 65 up to just under the rear end of the saw table top. The rear side of the hopper 65, which is designated at 67 in Figure 1, projects upwardly and to the rear from the bottom the hopper. The front 66 and rear 67, and the bottom of the hopper 65, may be formed from one integral sheet, or they may be fabricated together. The sides of the hopper 65 are outwardly flared in the top portion and are best shown in Figure 4 and indicated by the reference characters 68 and 69. Also, from Figure 4 it will be noted that the bottom of the hopper 65 is considerably narrower than the saw table or conveyor.

Referring to Figure 1 of the drawings, it will be seen that the seed cane is elevated from the hopper 65 and delivered into a seed storage bin, indicated generally at 70, by means of an elevator indicated generally at 71. The elevator 71 is of a conventional type in widespread use, and consists essentially of a pair of endless chains 72 carrying outwardly projecting slats or cleats 73. The slats 73 are preferably perforated so as to permit fungicide solution to drain from the seed cane as it is elevated from the bottom of the hopper 65, as shown in Figure 1. The chains 72 and slats 73 run over a light metal plate 74 extending the full length of the conveyor between the chains 72. The elevator in normal operation is held at a steep inclination to facilitate the draining operation. The plate 74, which extends the full length of the elevator and extends down into the hopper 83, serves as a drain board to carry the liquid drained off the seed segments and the slats back into the hopper to conserve the liquid. The chains 72 run over a lower set of sprockets 76, an upper set of sprockets 77, and an intermediate set of sprockets 78. The lower set of sprockets 76 is driven by a chain 79 running over a sprocket 75 carried on the shaft 75' which also carries the sprockets 76. Sides 80 are provided on opposite sides of the conveyor frame so as to retain the seed cane therebetween. The conveyor 71 is so constructed that it may be folded on a hinge on the shaft 78' carrying the intermediate set of sprockets 78 to allow for clearance under obstructions while the seed cutter 10 is moved from field to field. The apron 74 is divided on the line 74' shown in Figure 4. The hinge for permitting folding of the elevator is a conventional feature in elevating conveyors and forms no part of my present invention. The lower end of the conveyor 71 is disposed in the bottom of the hopper 65, and it is additionally supported intermediate its ends in the position shown by means of a pair of posts 81 and braces 82 (Figure 1) extending up from the chassis 11.

Referring to Figures 1 and 7, it will be seen that the hopper 83 of the seed storage hopper 70, is supported on a platform 84 at such a height as to permit seed planters, such as the one indicated at 85, to pass thereunder. The platform 84 is supported by frame structures 86 and 87 on a pair of front wheels 88 and a pair of rear wheels 89, respectively.

The bottom of the hopper 83 comprises a pair of bottom sections or doors 90 and 91, each of which is mounted upon rollers 92 at opposite ends. The sections 90 and 91 are adapted to be moved together so as to close the bottom of the hopper 83 with the front edges of the sections 90 and 91 closing at the line 93 (Figure 7).

In order to open the bottom of the hopper 83 by separating the sections 90 and 91 to the positions indicated in broken outlines in Figure 7, each of the sections is provided on its opposite ends with a pair of racks 94. On each side of the hopper 83 there is mounted a set of pinion gears 95 which are supported by suitable brackets from the platform 84 so as to engage the respective racks 94. Referring to Figure 1, it will be seen that two of the pinions 95 are mounted upon a shaft 96, while as shown in Figure 7, the other two pinions are mounted upon a shaft 97. A pair of sprockets 98 is mounted on the shafts 96 and 97 outwardly from the front set of pinions 95. A crossed chain 99 runs over the sprockets 98 so as to turn them in opposite directions (Figure 7).

The shaft 96 is longer than shaft 97 and extends to the front of the seed storage hopper 70 and carries on its outer end a large sprocket wheel 102. A chain 103 runs over the sprocket wheel 102 and a lower smaller sprocket 104, which is carried upon a stub shaft 105. A hand wheel 106 is also carried on the shaft 105 which may be used in operating the mechanism for opening and closing the bottom of the hopper 83. It will be seen that the driving connections are such that by turning the hand wheel 106 in one direction (clockwise), the bottom of the hopper 83 is opened, while turning the hand wheel 106 in the opposite direction (counter-clockwise), the bottom is closed.

When the seed storage hopper 70 is moved from field to field, cross braces (not shown) are secured in place to adequately brace the frames 86 and 87 together.

While the presently preferred embodiment of the invention, and its method of operation, have been described above in detail, it will be understood that certain modifications may be made therein without departing from the spirit and scope of the invention. Accordingly, it is intended that all matter described above or shown in the accompanying drawings, shall be interpreted as illustrative and not in a limiting sense.

I claim:

1. Machine for large scale conversion of full length sugar cane stalks into fungicide-treated seed segments for planting, comprising in combination, a saw unit comprising a plurality of circular saws spaced apart on a single shaft, conveyor means for delivering sugar cane stalks into said saw unit and for carrying away the seed segments from the rear side thereof, a liquid-tight hopper disposed on the rear side of said saw unit and below said conveyor means whereinto the segments fall as they are carried away from the rear side of said saw unit, an elevator for removing said segments from said hopper while permitting liquid to drain therefrom, and power means for driving said saw unit, said conveyor means, and said elevator.

2. In combination, a cutting and conveying unit comprising a frame providing a substantially horizontal throat, a plurality of saws disposed transversely of the throat and spaced apart a distance equal to the length of the seed stalk segments to be produced, conveying means for carrying stalks to be cut through the throat and past the saws and discharging the segments at the rear of the throat, a liquid tight hopper at the rear of and below the discharge end of the conveying means for holding a bath of fungicidal liquid into which the cut seed segments are discharged from the conveying means and a travelling belt elevator having its lower end disposed in said hopper for raising the segments out of said hopper, said elevator having a drain board for draining the liquid from said segments back into the hopper.

3. The combination of claim 2 wherein the elevator belt is of substantially less width than the width of the throat and the sides of the hopper converge downwardly toward the bottom to collect the segments by gravity and deliver them to the elevator.

4. The combination of claim 2 wherein the elevator belt comprises a series of transverse slats and a drain board disposed under the upward run of the slats and extending down into the hopper for draining the fungicide liquid from the segments back into the hopper.

5. In combination, cutting means for cutting cane stalks into segments, a liquid tight hopper for holding a bath of fungicide liquid, a conveyor for delivering the segments from the cutting means into said hopper, and an elevator having its lower end disposed in the bottom of said hopper and comprising an open slat work belt and a drainboard extending upwardly from the hopper to drain the fungicide from the segments and elevator back into the hopper.

6. In a cane seed preparing machine, the combination of cutting means for cutting stalks into segments of cane seed length, dipping means comprising a hopper adapted to hold a bath of fungicide, a conveyor for carrying the segments directly from the cutting means and dropping them into the fungicide bath, and segment draining means comprising an elevator having a slat belt running over a drain board, said elevator having its lower end disposed in the lower end of the hopper to remove the segments from the bath and to drain excess liquid fungicide back into the hopper.

7. In a cane seed preparing machine, the combination of stalk cutting means for cutting stalks into segments, conveying means for conveying stalks through the cutting means and for discharging the resulting segments, a hopper disposed below the discharge end of the conveying means, said hopper being adapted to contain a bath of fungicide liquid and an elevator for elevating the segments out of the bath and discharging the same to a delivery receptacle, said elevator having an inclined drain surface for draining the liquid from the segments back into the hopper.

8. In combination, a cutting table for receiving full length stalks, a plurality of cutters disposed transversely to the stalks for cutting the stalks on the table into segments, means for feeding the stalks to the cutters, a hopper below the table and behind the cutter to receive the segments, said hopper being liquid-tight to maintain a bath of fungicide therein, and an elevator extending down into the bottom part of the hopper for dipping the segments out of the bath of fungicide and draining the same.

WILLIAM M. MORAGNE.

REFERENCES CITED

The following references are of record in the file of this patent:

UNITED STATES PATENTS

| Number | Name | Date |
| --- | --- | --- |
| 1,831,176 | Holm-Hansen | Nov. 10, 1931 |
| 1,943,030 | McKee | Jan. 9, 1934 |
| 2,002,164 | Uyematsu | May 21, 1935 |

OTHER REFERENCES

Deerr: "Cane Sugar," 2d ed. (1921), p. 172.